(12) United States Patent
Serencsits

(10) Patent No.: US 11,717,992 B2
(45) Date of Patent: Aug. 8, 2023

(54) APPARATUS AND METHOD FOR IMPROVED HEATING AND COOLING RATES OF A COMPOSITE CURE TOOL

(71) Applicant: The Boeing Company, Chicago, IL (US)

(72) Inventor: William L. Serencsits, Charleston, SC (US)

(73) Assignee: The Boeing Company, Arlington, VA (US)

( * ) Notice: Subject to any disclaimer, the term of this patent is extended or adjusted under 35 U.S.C. 154(b) by 545 days.

(21) Appl. No.: 16/785,038

(22) Filed: Feb. 7, 2020

(65) Prior Publication Data

US 2021/0245403 A1    Aug. 12, 2021

(51) Int. Cl.
*B29C 35/02* (2006.01)
*B29C 35/16* (2006.01)

(52) U.S. Cl.
CPC ............ *B29C 35/02* (2013.01); *B29C 35/16* (2013.01); *B29C 2035/1658* (2013.01)

(58) Field of Classification Search
None
See application file for complete search history.

(56) References Cited

U.S. PATENT DOCUMENTS

| | | | | |
|---|---|---|---|---|
| 5,230,855 A | * | 7/1993 | Kargarzadeh | B29C 33/02 264/318 |
| 2004/0003738 A1 | * | 1/2004 | Imiolek | B33Y 30/00 101/480 |
| 2014/0326035 A1 | * | 11/2014 | Halford | B21D 37/16 72/342.4 |
| 2015/0017390 A1 | * | 1/2015 | Mine | B29C 43/203 428/156 |
| 2019/0337210 A1 | * | 11/2019 | Hardie | B29C 45/74 |

* cited by examiner

*Primary Examiner* — Jacob T Minskey
*Assistant Examiner* — Adrien J Bernard
(74) *Attorney, Agent, or Firm* — Kunzler Bean & Adamson

(57) ABSTRACT

Disclosed herein is a cure tool for managing a thermal cycle of a composite component. The cure tool, in certain examples, includes a base plate comprising a work surface, for supporting the composite component, and a back surface opposite the work surface. The cure tool also includes one or more fins protruding from the back surface of the base plate and in thermal communication with the base plate. The cure tool additionally includes one or more heating elements coupled to each of the one or more fins and configured to selectively provide heat to the base plate.

20 Claims, 11 Drawing Sheets

APPARATUS AND METHOD FOR IMPROVED HEATING AND COOLING RATES OF A COMPOSITE CURE TOOL

FIELD

This disclosure relates generally to methods and equipment for curing composite parts, and deals more particularly with a cure tool having heating elements positioned on fins of the cure tool.

BACKGROUND

Composite parts, such as those used in the aircraft industry, may be fabricated in a multi-step process in which separate tooling is used for laying up, forming-to-shape, and curing a multi-ply composite component. The composite component may be assembled by sequentially laying up individual plies by hand or using automated equipment. A cure tool is used to help shape and heat the assembled uncured composite component. The cure tool can be used in conjunction with an autoclave or oven to further facilitate curing of the composite component.

Controlling the temperature of the cure tool during the cure cycle, both during the heat-up and cool-down stages of the cure cycle, helps promote a uniform and complete cure of the composite component. Coupling resistive, inductive, or fluid heaters to cure tools is a cost-effective way to heat a cure tool. However, heaters are unable to finely control the cooling rate of the cure tool and thus the assembled composite component. In fact, the heaters of conventional cure tools can act as thermal insulators that further limit the cooling rate and increase the cycle time of composite components. Accordingly, common cure tools lack the ability to finely control both the heating stage and the cooling stage of the cure cycle of composite components. Accordingly, improving heating and cooling rates of a composite cure tool is desirable.

SUMMARY

The subject matter of the present application provides example cure tools that overcome the above-discussed shortcomings of prior art techniques. The subject matter of the present application has been developed in response to the present state of the art, and in particular, in response to shortcomings of cure tools, and the conventional methods and systems for controlling cure cycles of composite components.

Disclosed herein is a cure tool for managing a thermal cycle of a composite component. The cure tool, in certain examples, includes a base plate comprising a work surface, for supporting the composite component, and a back surface opposite the work surface. The cure tool also includes one or more fins protruding from the back surface of the base plate and in thermal communication with the base plate. The cure tool additionally includes one or more heating elements coupled to each of the one or more fins and configured to selectively provide heat to the base plate. The preceding subject matter of this paragraph characterizes example 1 of the present disclosure.

The controller, in certain examples, is operatively coupled with the heating element and configured to selectively control the one or more heating elements to generate heat. The controller, in certain examples, is also configured to raise a temperature of the cure tool during a heating portion of a cure cycle, by selectively controlling the one or more heating elements to generate heat, and to lower the temperature of the cure tool during a cooling portion of the cure cycle, by selectively controlling a heat output of the one or more heating elements. The preceding subject matter of this paragraph characterizes example 2 of the present disclosure, wherein example 2 also includes the subject matter according to example 1, above.

The cure tool, in certain examples, also includes an air movement system configured to generate an air flow of a predetermined temperature and direct the air flow across the one or more fins. The preceding subject matter of this paragraph characterizes example 3 of the present disclosure, wherein example 3 also includes the subject matter according to example 2, above.

In certain examples, the controller is operatively coupled with the air movement system, and configured to selectively control the air movement system to generate the air flow of the predefined temperature and direct the air flow across the one or more fins. The preceding subject matter of this paragraph characterizes example 4 of the present disclosure, wherein example 4 also includes the subject matter according to example 3, above.

In certain examples, each of the one or more fins protrudes outwardly from the back surface of the base plate a substantially same distance which is in the range of between about 0.5 inches and about 5 inches. The preceding subject matter of this paragraph characterizes example 5 of the present disclosure, wherein example 5 also includes the subject matter according to example 4, above.

In certain examples, each of the one or more fins protrudes outwardly from the back surface of the base plate a different distance than at least one of the other fins. The preceding subject matter of this paragraph characterizes example 6 of the present disclosure, wherein example 6 also includes the subject matter of example 4, above.

At least one fin of the one or more fins, in certain examples, comprises a planar surface, and at least one heating element of the one or more heating elements is coupled to the planar surface of the fin. The preceding subject matter of this paragraph characterizes example 7 of the present disclosure, wherein example 7 also includes the subject matter according to any one of examples 1-6, above.

In certain examples, at least one fin of the one or more fins comprises a non-planar surface, and at least one heating element of the one or more heating elements is coupled to the non-planar surface of the fin. The preceding subject matter of this paragraph characterizes example 8 of the present disclosure, wherein example 8 also includes the subject matter according to any one of examples 1-7, above.

The one or more fins, in certain examples, are releasably coupled to the base plate. The preceding subject matter of this paragraph characterizes example 9 of the present disclosure, wherein example 9 also includes the subject matter according to any one of examples 1-8, above.

In certain examples, at least one fin of the one or more fins comprises a channel, and at least one heating element of the one or more heating elements is at least partially positioned within the channel. The preceding subject matter of this paragraph characterizes example 10 of the present disclosure, wherein example 10 also includes the subject matter according to example 9, above.

At least one fin of the one or more fins, in certain examples comprises a mounting surface, and the base plate comprises a recess. The mounting surface of the at least one fin is nested within the recess of the base plate. The preceding subject matter of this paragraph characterizes example 11 of the present disclosure, wherein example 11 also includes the subject matter according to example 9 above.

The cure tool, in certain examples, also includes a thermally conductive compound disposed between the recess of the base plate and the mounting surface of the at least one fin. The cure tool also includes at least one fastener coupling the at least one fin to the base plate. The preceding subject matter of this paragraph characterizes example 12 of the present disclosure, wherein example 12 also includes the subject matter according to example 11, above.

In certain examples, at least one fin also includes a flange configured to engage the back surface of the base plate, and a web protruding from the flange and away from the back surface. In certain examples, at least one heating element of the one or more heating elements is coupled to the flange or the web of the at least one fin. The preceding subject matter of this paragraph characterizes example 13 of the present disclosure, wherein example 13 also includes the subject matter according to any one of examples 1-12, above.

In certain examples, the at least one heating element is coupled to the flange. The preceding subject matter of this paragraph characterizes example 14 of the present disclosure, wherein example 14 also includes the subject matter according to example 13, above.

The web, in certain examples, extends longitudinally along a length of the flange and protrudes from the flange at a middle portion of the flange to divide the flange into a first flange portion and a second flange portion. In certain examples, the at least one heating element is disposed on the flange and extends around the web and along both the first flange portion and the second flange portion. The preceding subject matter of this paragraph characterizes example 15 of the present disclosure, wherein example 15 also includes the subject matter according to example 14, above.

In certain examples, the web extends longitudinally along a length of the flange and protrudes from an edge of the flange, and the at least one heating element is disposed on the flange adjacent the web. The preceding subject matter of this paragraph characterizes example 16 of the present disclosure, wherein example 16 also includes the subject matter according to example 14, above.

The at least one heating element, in certain examples, is coupled to the web. The preceding subject matter of this paragraph characterizes example 17 of the present disclosure, wherein example 17 also includes the subject matter according to example 13, above.

Also disclosed is a method of controlling a cure cycle for a composite component. The method, in certain examples, includes locating the composite component on a work surface of a base plate, and activating at least one heating element of one or more heating elements coupled to each of one or more fins to raise a temperature at a predetermined rate of the one or more fins and the base plate, thermally coupled to the one or more fins and from which the one or more fins protrudes, to a predetermined temperature for a predetermined amount of time and to heat the composite component, wherein the predetermined temperature and the predetermined amount of time are selected to cure a resin of the composite component. The method also includes, in certain examples, after heating the composite component, blowing air, at a cooling temperature less than the predetermined temperature, across the one or more fins to cool the composite component at a predetermined rate. The preceding subject matter of this paragraph characterizes example 18 of the present disclosure.

The method also includes, in certain examples, before blowing air at the cooling temperature and after heating the composite component, blowing air, substantially at the predetermined temperature, across the one or more fins. The method also includes after blowing air at the predetermined temperature and before blowing air at the cooling temperature, decreasing an amount of heat output of the at least one heating element. The preceding subject matter of this paragraph characterizes example 19 of the present disclosure, wherein example 19 also includes the subject matter according to example 18, above.

Also disclosed is a cure tool for managing a thermal cycle of a composite component. The cure tool, in certain examples, includes a base plate comprising a work surface, for supporting the composite component, and a back surface opposite the work surface. The cure tool also includes a fin protruding from the back surface of the base plate and in thermal communication with the base plate, and a heating element coupled to the fin and configured to selectively provide heat to the base plate. The preceding subject matter of this paragraph characterizes example 20 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
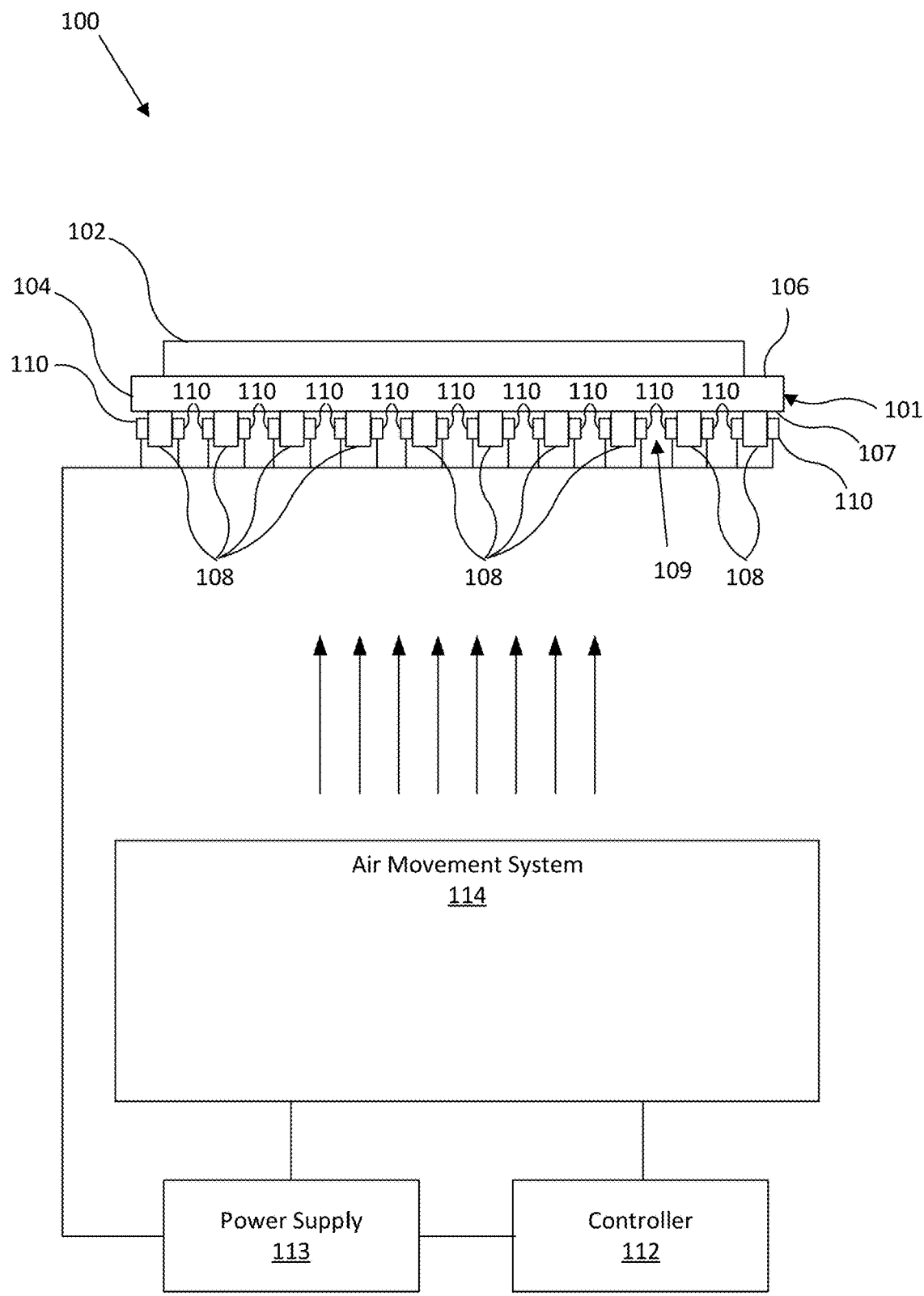
FIG. 1 is a schematic block diagram of a system for improved control of heating and cooling rates of a composite cure tool, according to examples of the subject disclosure.

FIG. 1 is a schematic diagram of a system 100 for improved control of heating and cooling rates of a composite cure tool, according to examples of the subject disclosure. The system 100, in certain examples, includes a cure tool 101 configured to cure a composite component 102, which can include a layup of composite plies, by any of various techniques, including but not limited to, autoclave curing, oven curing, pressclave curing, in-situ curing, etc. The composite component 102, in certain examples, includes multiple layers, or plies, of a fiber reinforced matrix material. Examples of a matrix material include, but are not limited to, a variety of thermoset or thermoplastic resins. Examples of fibers of the composite component 102 include, but are not limited to, continuous or non-continuous carbon/graphite, aramid and glass fibers, etc. The fibers, in certain examples, are in the form of yarns, tapes, tows, rovings, woven or knitted fabrics, mats, etc. The composite component 102 is illustrated here as rectangular, however a wide variety of other shapes and sizes are possible.

With reference to FIGS. 1 and 2a-c, the cure tool 101 includes a base plate 104 comprising a work surface 106, for supporting the composite component 102, and a back surface 107 opposite the work surface 106. The cure tool 101 further includes one or more fins 108 protruding from the back surface 107 of the base plate 104 and in thermal communication with the base plate 104. The cure tool further includes one or more heating elements 110 (see FIGS. 2a-2c) coupled to each of the one or more fins 108 and configured to selectively provide heat to the base plate 104.

In certain examples, the composite component 102 is supported on the work surface 106 of the cure tool 101. As depicted here, the work surface 106 is substantially planar and configured to engage a surface of the composite component 102. However, in other examples, the work surface 106 is non-planar (see e.g., FIGS. 9a and 9b) and is formed with a surface profile that matches an inner or outer surface profile of the composite component 102. Accordingly, the work surface 106 of the cure tool 101 is configured to maintain contact with an outer surface of the composite component 102, which helps facilitate heat transfer between the composite component 102 and the cure tool 101. The cure tool 101 is made from various types of materials depending upon the application including, but not limited to, metals, polymers, ceramics, and composite materials, such as carbon fiber.

The cure tool 101, in certain examples, includes a back surface 107 that is opposite the work surface 106. The cure tool 101 additionally includes one or more fins 108 that are coupled (e.g., releasably coupled) to the back surface 107. The fins 108 extend outward from the back surface 107 in a direction generally oblique to or away from the work surface 106. The fins 108, in certain examples, extend outward orthogonally from the work surface 106 such that adjacent fins 108 are parallel to each other. In certain examples, the fins 108 extend outward at non-orthogonal angles (see e.g., FIG. 9b). Flow channels 109 are formed between adjacent pairs of fins 108 and are configured to direct a flow of air across the back surface 107 and the fins 108 to aid in the curing of the composite component 102. As used herein, the term "air" can refer to atmospheric air, nitrogen, and/or any fluid suitable for the heating and cooling of the cure tool 101.

The system 100, in certain examples, includes an air movement system 114 configured to generate an air flow and direct the air flow towards the cure tool 101 and through the flow channels 109 defined by the fins 108. The system 100 also includes a controller 112 that is configured to control a cure cycle time-temperature profile ("cure cycle") of the composite component 102. The cure cycle, in certain examples, includes at least one heating stage or portion and at least one cooling stage or portion. The controller 112 is operatively coupled to and controls the operation of the air movement system 114 as well as heating elements 110 (see e.g., FIGS. 2a-9b) based on a set of instructions stored in memory and by monitoring system temperature via thermocouples or other temperature monitoring sensors. In certain examples, the controller 112 controls a power supply 113 that includes relays that operate at a duty cycle to maintain a heating rate and dwell temperature of the composite component 102. In some examples, the power supply 113 is a voltage regulator that controls a power of the air movement system 114 or other heaters. These instructions dictate a temperature to which the composite component 102 is heated during the cure cycle and a duration of the heating portion of the cure cycle.

Upon completion of the heating portion of the cure cycle, the controller 112 disables, or decreases the output of, the heating elements 110. As such, the controller 112 is configured to control a cool-down rate of the composite component 102. The air movement system 114 is configured to provide heated air at a temperature that is selected to speed-up and maintain the predetermined temperature throughout the heating portion. The temperature of the heated air, in certain examples, is substantially the same as the predetermined temperature of the heating portion of the cure cycle. As used herein, the phrase "substantially the same," or other variations including the word "substantially," refers to a range of values within plus or minus 10% of the referenced value. The air movement system 114 is also configured to provide a cooled air at a predetermined temperature during the cooling portion of the cure cycle. During the cooling portion of the cure cycle, the fins 108 dissipate heat from a base plate 104 of the cure tool 101.

Figure 2A:
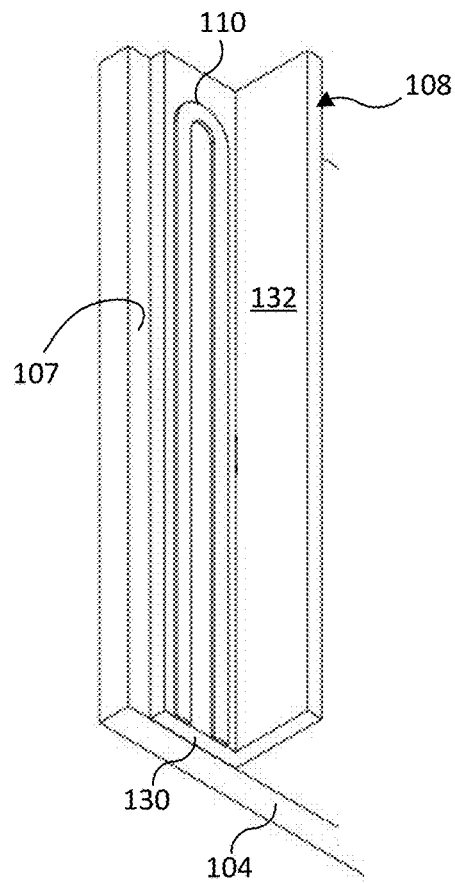
FIG. 2a is a perspective view of a fin coupled to a base plate, according to examples of the subject disclosure.
Figure 2B:
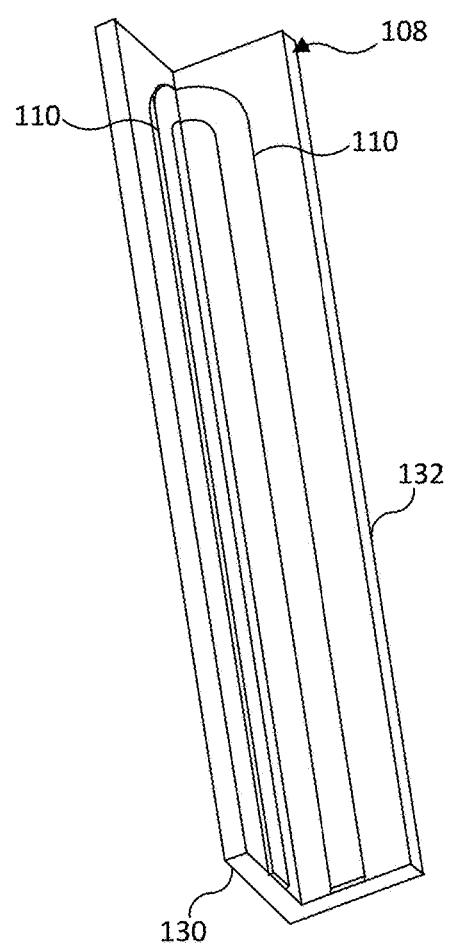
FIG. 2b is a perspective view of a fin, according to examples of the subject disclosure.
Figure 2C:
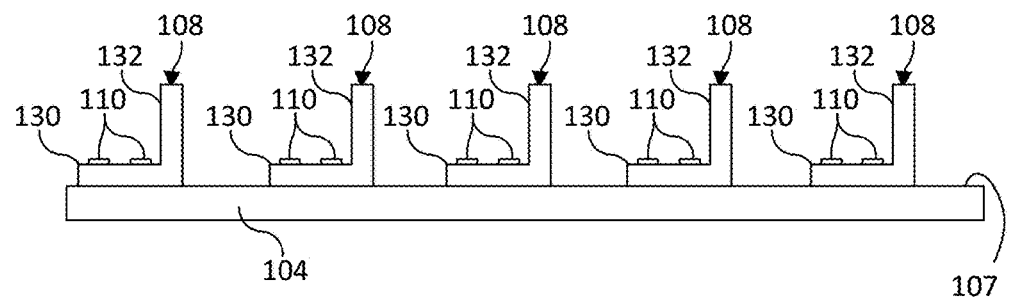
FIG. 2c is a side elevation view of a plurality of fins coupled to a base plate, according to examples of the subject disclosure.

FIGS. 2a-2c illustrate variations of the fins 108, according to examples of the subject disclosure. FIG. 2a illustrates a partial view of the back surface 107 having a single fin 108 coupled to the back surface 107. Although some examples herein show a single fin 108, it is to be understood that other examples of the subject disclosure include multiple fins 108 that are arranged in, for example, evenly or non-evenly spaced rows (see, e.g., FIG. 2c). Each fin 108, in certain examples, is formed with a base or flange 130 that is configured to releasably and thermally couple to the back surface 107. A web 132 extends, in certain examples, along a length of the flange 130 and protrudes from an edge of the flange 130. Each fin 108 of FIGS. 2a-2c, in certain examples, is formed of an elongated, metal angle stock (e.g., aluminum angle stock). It is contemplated that the fins 108 of FIGS. 2a-2c, in certain examples, are formed in other configurations, including but not limited to, rows of pillars or pins, rows of cubes, etc., and made of other thermally conductive materials.

In certain examples, a heating element 110 is disposed on a surface of the fin 108. The heating element 110 is configured to convert electrical energy into heat by, for example, resistive or Joule heating. The heating element 110 is electrically coupled to the controller 112 and configured to output heat when directed to by the controller 112. The heating element 110, in certain examples, is disposed on the flange 130. This beneficially positions the heating element 110 closest to the base plate 104 and improves a heating rate of the composite component 102. In certain examples, the heating element 110 spans or extends from the flange 130 to the web 132 (see FIG. 2b). Accordingly, upon being energized, the heating element 110 outputs heat directly to the flange 130 (or indirectly to the flange 130 via the web 132) and subsequently indirectly to the composite component 102 via the flange 130 and the base plate 104 by thermal conduction.

Figure 3:
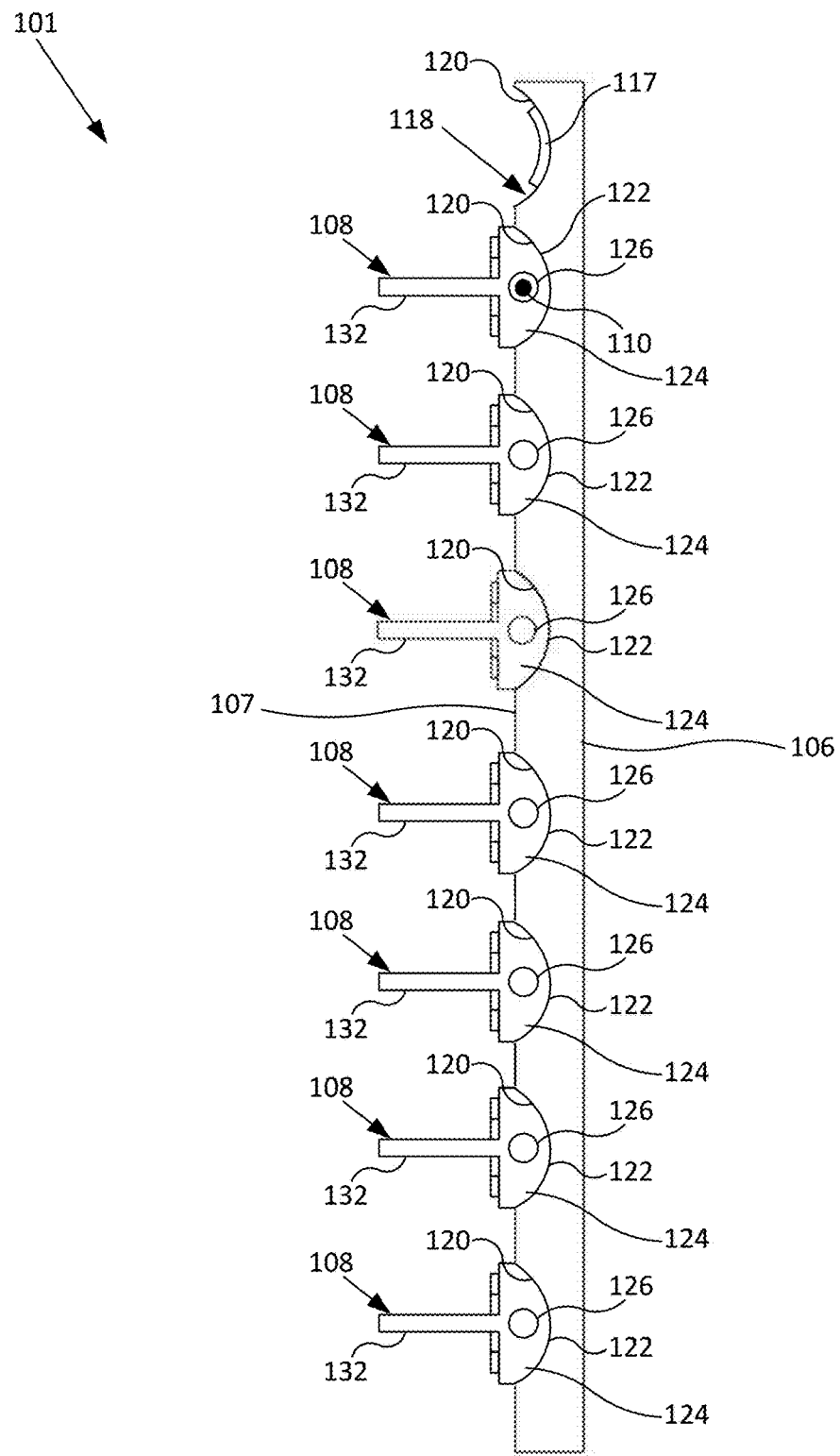
FIG. 3 is a side-view diagram of the cure tool, according to examples of the present disclosure.
Figure 4:
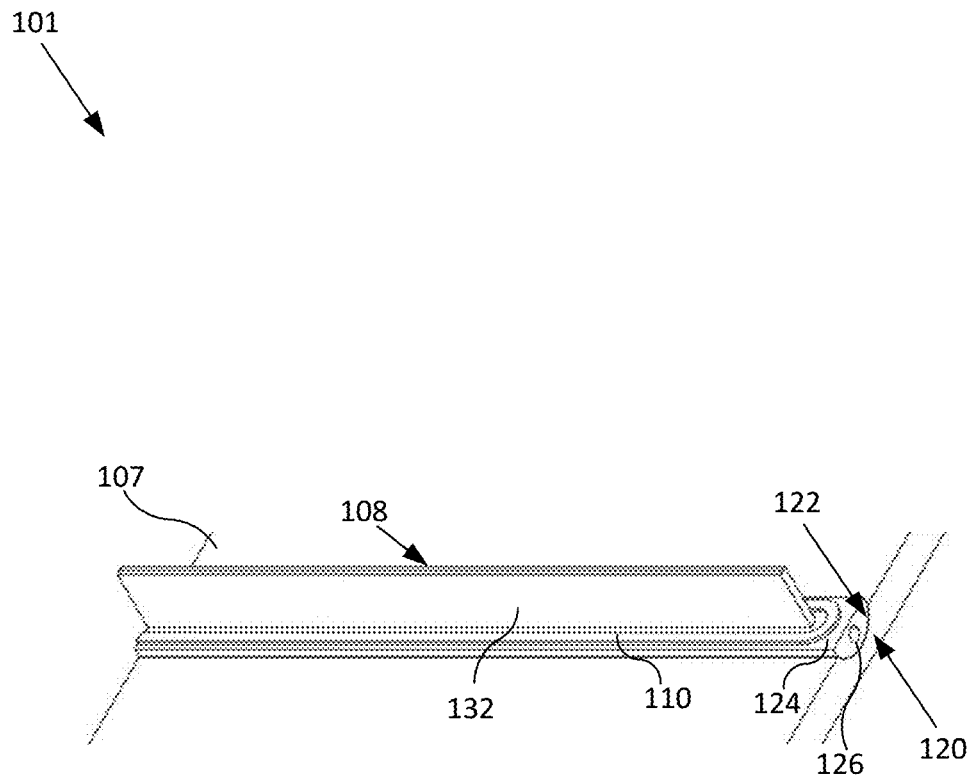
FIG. 4 is a partial perspective view diagram of a fin having a fin base, according to examples of the subject disclosure.

FIG. 3 is a side-view diagram of the cure tool 101, according to alternative examples of the present disclosure. As shown in FIGS. 3 and 4, each fin 108 includes a base 124. The back surface 107, in certain examples, includes one or more recesses 118 having a cross-sectional profile selected to engage the base 124 of a corresponding one of the fins 108. In the depicted example, the base 124 is has a mounting surface 122 with a semi-circular cross-sectional profile, however, other cross-sectional profiles are contemplated, including, but not limited to polygonal shapes. The recess 118, in certain examples, is formed with a recess surface 120 having a cross-sectional profile that conforms to the shape of the base 124 of the fin 108 so that the mounting surface 122 nests within the recess 118. Beneficially, a curved cross-sectional profile of the base 124 increases a surface area of the interface between the fin 108 and the back surface 107, which improves heat transfer between the heating elements 110 and the work surface 106. As described above, a thermally conductive compound 117, in certain examples, is disposed between the mounting surface 122 and the recess surface 120 to promote heat transfer. The recess 118 labeled in FIG. 3 is shown without a corresponding fin 108 to better show the configuration of the recess 118 and the thermally conductive compound 117.

In certain examples, a channel 126 is formed within the base 124 of each fin 108. The channel 126 is configured to receive a heating element 110. A hollow or non-hollow tubular heating element 110 is at least partially positioned within the channel 126 in some examples. Examples of heating elements 110 that may be positioned in the channel include, but are not limited to, a resistive heat rod, an inductive wire, fluid heat, etc.

FIG. 4 is a partial perspective view diagram of a fin 108 having a fin base 124, according to some examples of the subject disclosure. The fin base 124 (which functions as flange 130), in certain examples, has a semi-circular cross-sectional profile that defines the mounting surface 122. The mounting surface 122 engages a matching recess surface 120 formed in the back surface 107.

In certain examples, the web 132 protrudes from the base 124 and extends longitudinally along the base 124. In certain examples, in one direction, the web 132 terminates at an area spaced-apart from an end of the base 124, so as to leave open an area of the base 124 for the heating element 110 to extend around the web 132. The heating element 110, in certain examples, has a U-shaped configuration that extends along the base 124 and partially encircles the web 132. The fin 108, according to some examples, includes a single heating element 110 which is positioned on the web 132 and/or base 124 (see, e.g., FIG. 4). According to some examples, the fin 108 includes multiple heating elements 110 (see e.g., FIG. 5b). In certain examples, the web 132 extends completely to the end of the fin base 124 and a separate heating element 110 is positioned on each side of the web 132.

Figure 5A:
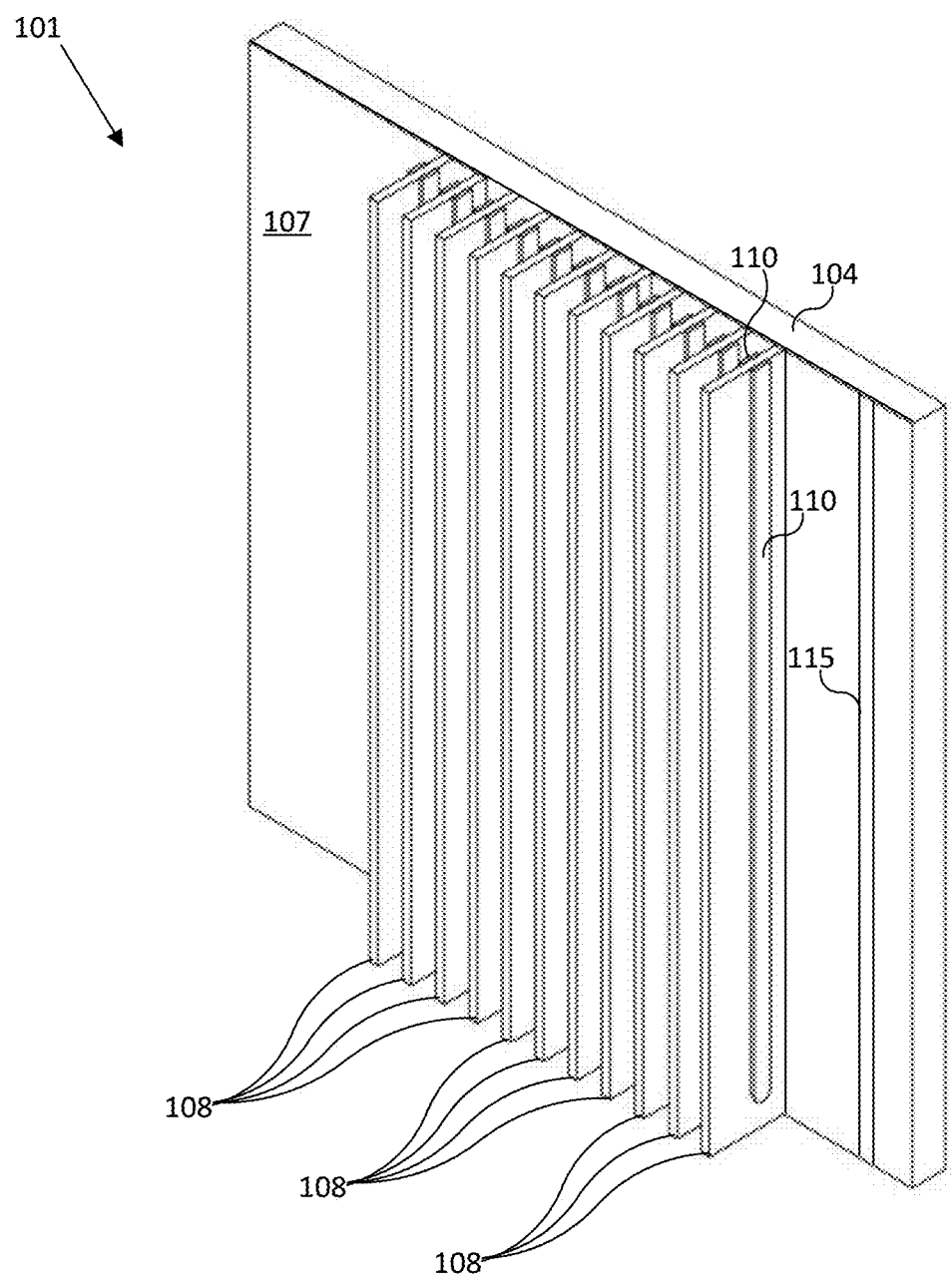
FIGS. 5a and 5b are a perspective view and a side view diagram, respectively, of a series of fins insertable into a back surface, according to examples of the subject disclosure.
Figure 5B:
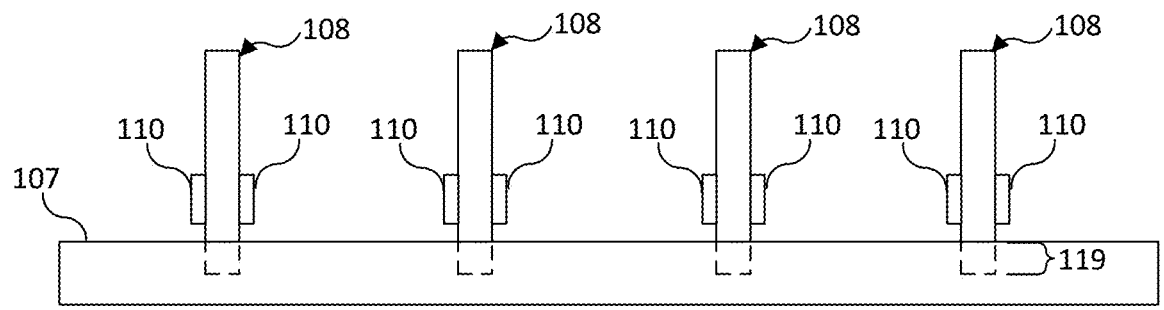

FIGS. 5a and 5b are a perspective view and a side view diagram, respectively, of a series of fins 108 insertable into a back surface 107, according to examples of the subject disclosure. The fins 108, in certain examples, are formed of elongated and rectangular sheets of metal, or other thermally conductive material, that are insertable into a slot 115 formed in the back surface 107 of the base plate 104. Each fin 108 may be inserted into a slot 115 the same depth 119 (see, e.g., FIG. 5b), or alternatively, to different depths (see, e.g., FIG. 7). Beneficially, inserting fins 108 to different depths 119 allows for finer temperature control of different areas of the composite component 102, as the heated fins 108 are closer or farther away from the work surface 106 and consequently the composite component 102. In this example, and others described herein, a thermally conductive compound 117 or paste is disposed between the interface of the fin 108 and the base plate 104 to increase thermal conductivity across the interface of the fin 108 and the base plate 104.

In certain examples, the heating element 110 is disposed on at least one side of the fin 108. As depicted, a heating element 110 is disposed on each side of the fin 108. The heating elements 110, in certain examples, are separately controllable to different temperatures as presented above.

Figure 6A:
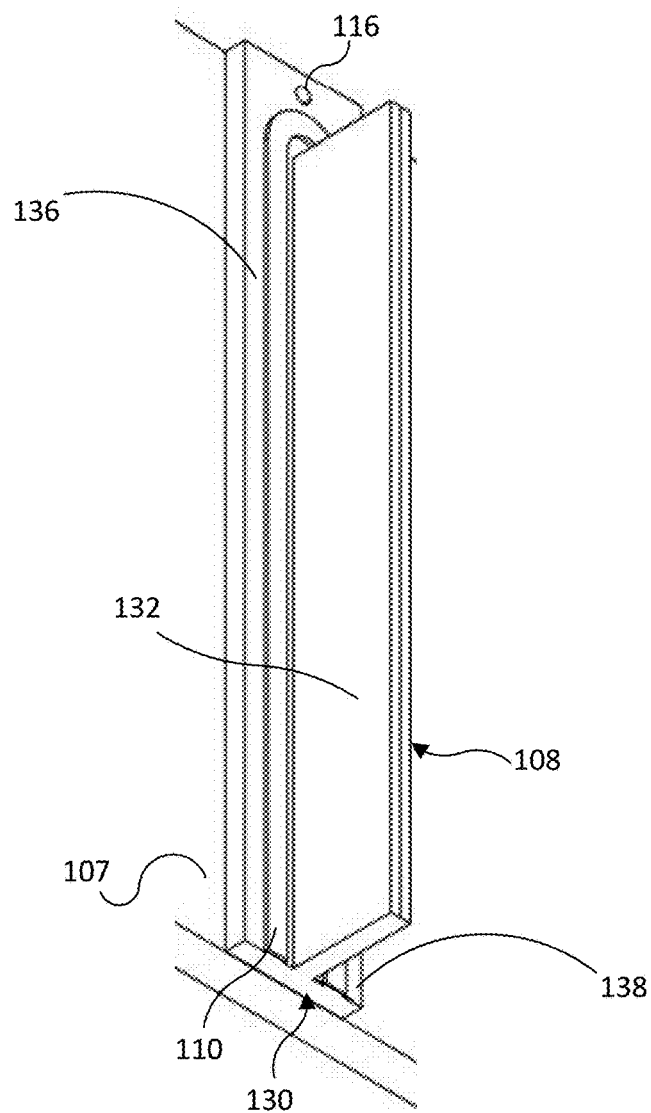
FIGS. 6a and 6b are perspective and side view diagrams, respectively, of fins having a T-shaped cross-section, according to examples of the subject disclosure.
Figure 6B:
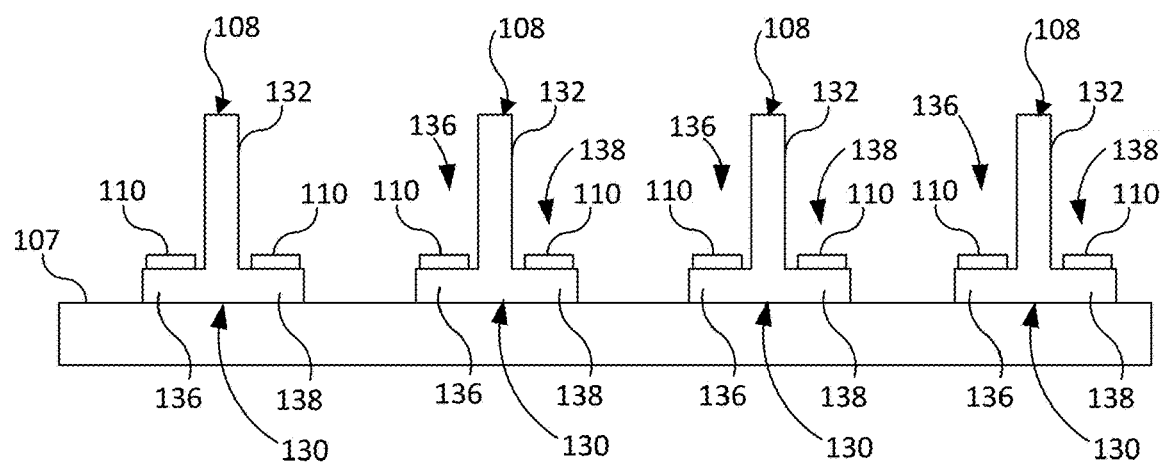

FIGS. 6a and 6b are perspective and side view diagrams, respectively, of fins 108 having a T-shaped cross-section, according to examples of the subject disclosure. In FIG. 6b, one heating element 110 is coupled to each one of the plurality of fins 108. As described above with reference to FIGS. 2a-2c, the web 132 of the fin 108 protrudes from the flange 130. Unlike FIGS. 2a-2c, in the depicted example, the web 132 extends longitudinally along a length of the flange 130 and protrudes from the flange 130 at a middle portion of the flange 130 to divide the flange 130 into a first flange portion 136 and a second flange portion 138. The heating element 110, in certain examples, extends around the web 132 from the first flange portion 136 to the second flange portion 138 to partially encircle the web 132 (see, e.g., FIG. 6a).

In certain examples, the fin 108 is releasably coupled to the back surface 107 of the base plate 104. In one example, a fastener 116 (see FIG. 6a) mechanically couples the flange 130 to the back surface 107. Other coupling mechanisms, which are semi-permanent coupling mechanisms, are also contemplated, including but not limited to, adhesives, welds, etc.

Figure 7:
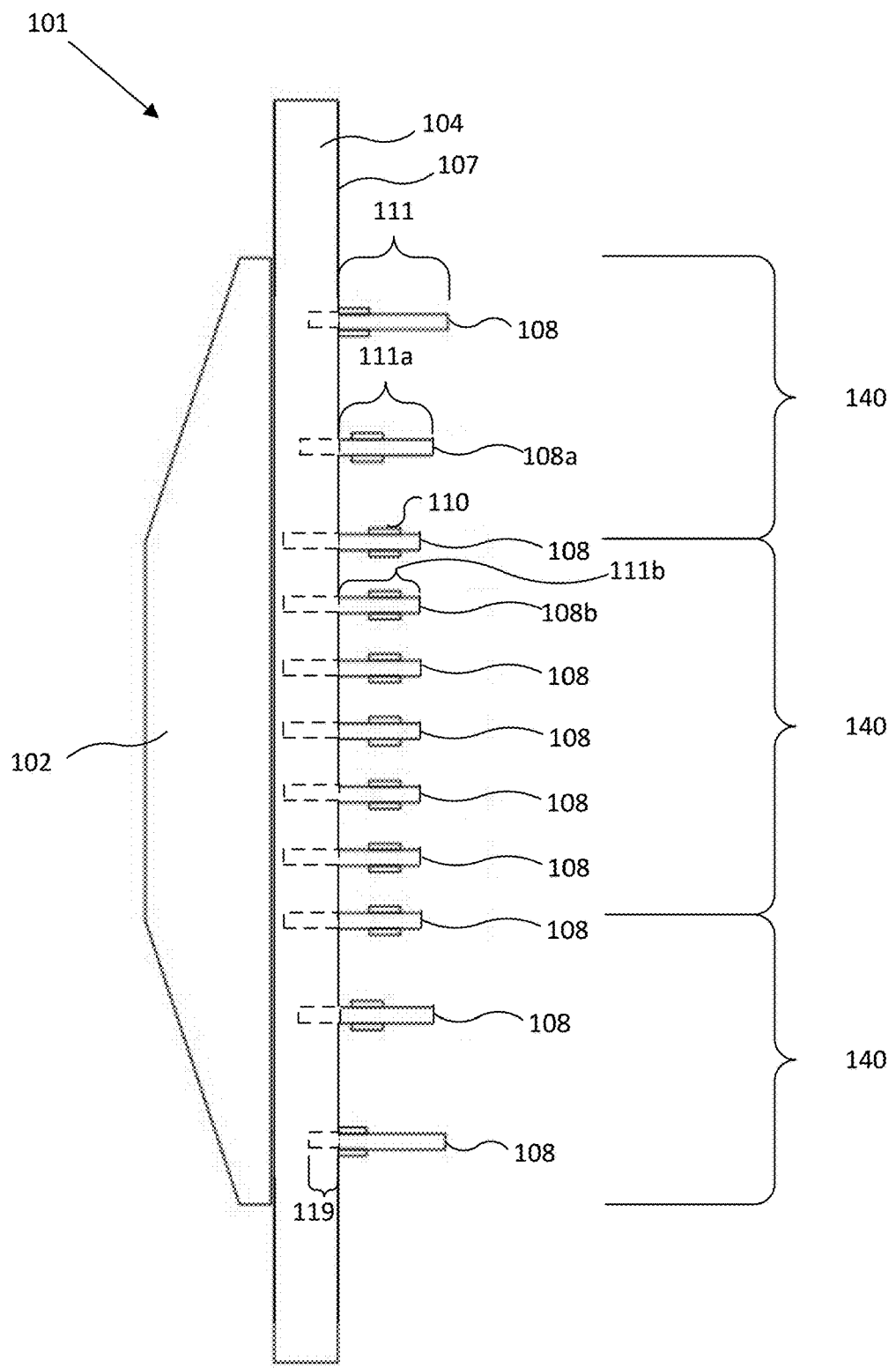
FIG. 7 is a side view diagram on the cure tool, according to examples of the subject disclosure.

FIG. 7 is a side view diagram on the cure tool 101, according to examples of the subject disclosure. In certain examples, the cure tool 101 is configured to engage composite components 102 of varying size and configuration. The system 100 is configured to selectively control the heating elements 110 of different fins to create different curing zones 140. Curing zones 140, in certain examples, are defined in response to a cross-sectional profile of the composite component 102. For example, in the depicted embodiment, three curing zones 140 are defined and the controller 112 is configured to apply a different curing profile (i.e., predetermined temperatures and times) to the different curing zones 140.

In certain examples, the fins 108 are insertable to different depths, which results in varying distances 111 away from the work surface 106 (e.g., heights), if the fins 108 have the same size, to account for the cross-sectional profile of the composite component 102. For example, a fin 108a has a first height 111a that is greater than a second height 111b of another fin 108b. The distances 111, or heights, are in the range of between about 0.5 inches and about 5 inches in some examples. However, in some examples (not shown), the fins 108 have different sizes such that even though the fins 108 are insertable to different depths, the distances 111 are the same. As used herein, the term "about" refers to ±10% of the referenced value. Adjusting the distance 111 of a fin 108 changes the effectiveness of the heating element 110 by increasing or decreasing heat transfer between the fin 108 and the composite component 102. In other examples, a spacing between adjacent fins 108 may be increased or decreased to modify the effective heat transfer from the cure tool 101 into the composite component 102. The spacing, in certain examples, is determined according to a thickness of the composite component 102 being cured.

Figure 8:
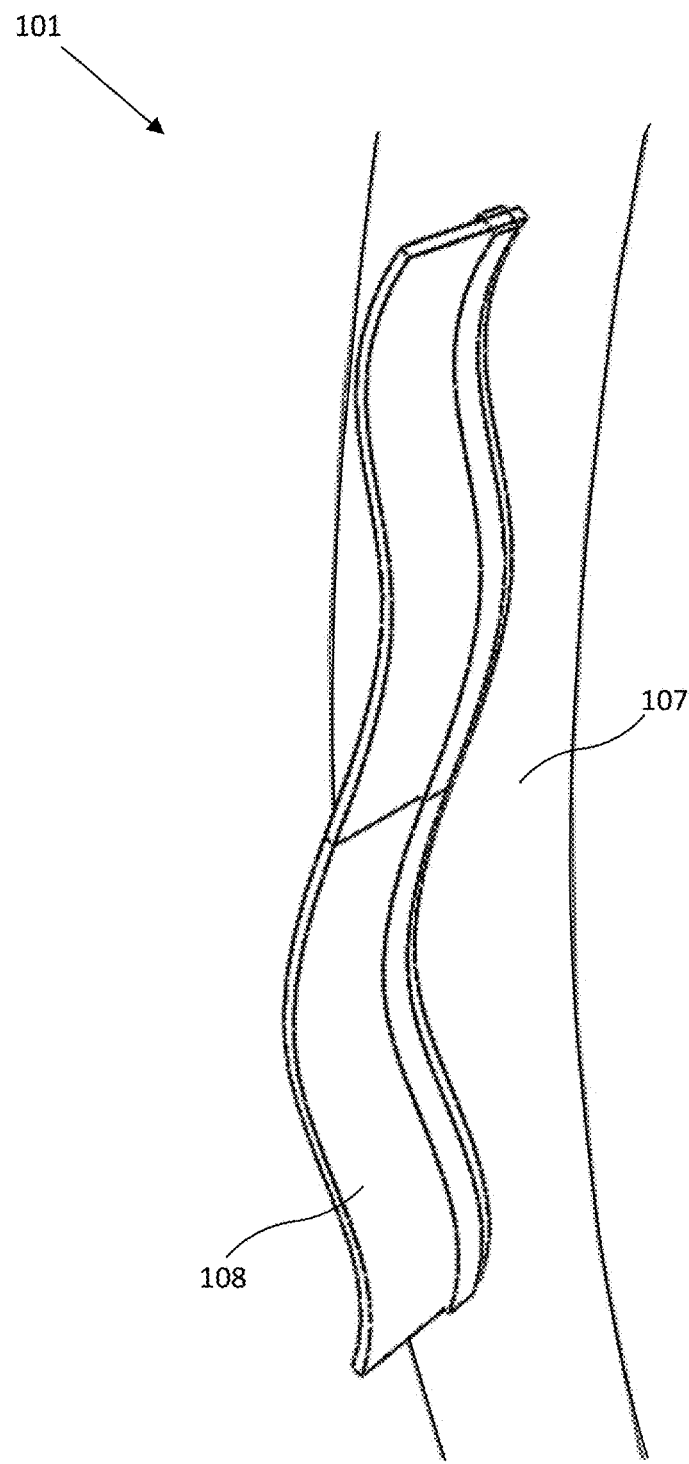
FIG. 8 is a perspective view diagram of a non-planar fin, according to examples of the present disclosure.

FIG. 8 is a perspective view diagram of a fin 108 that has a non-planar shape, according to examples of the present disclosure. The fin 108, in certain examples, is formed into complex shapes to increase surface area for heat transfer. The fin 108, in certain examples, is releasably coupled to a back surface 107 that has either a non-planar shape or a planar shape.

Figure 9A:
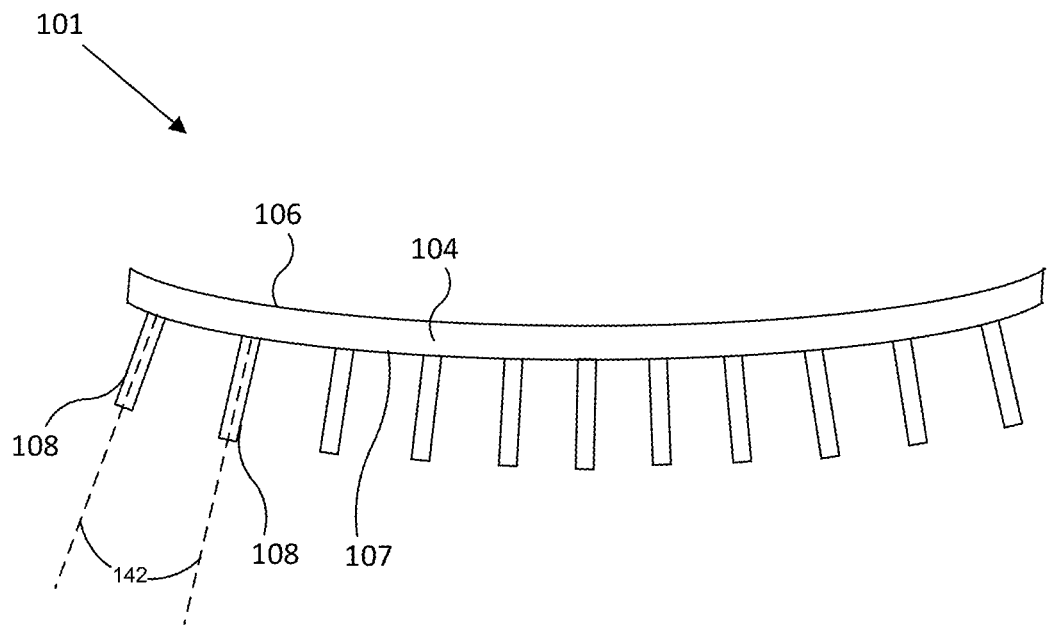
FIG. 9a is a side view diagram of the cure tool, according to examples of the subject disclosure.

FIG. 9a is a side view diagram of the cure tool 101, according to alternative examples of the subject disclosure. In the depicted example, the base plate 104 is formed with a non-planar cross-sectional profile so that the work surface 106 matches and engages an outer mold line of the composite component 102. In certain examples, the back surface 107 has a profile similar to that of the work surface 106, and the fins extend outward radially from the back surface 107. An angle 142 is defined by the directions of protrusion of the fins 108. For example, fins 108 mounted to a convex surface (as depicted) will have an angle 142 indicative of diverging fins 108, while fins 108 mounted to a concave surface will have an angle 142 indicative of converging fins 108.

Figure 9B:
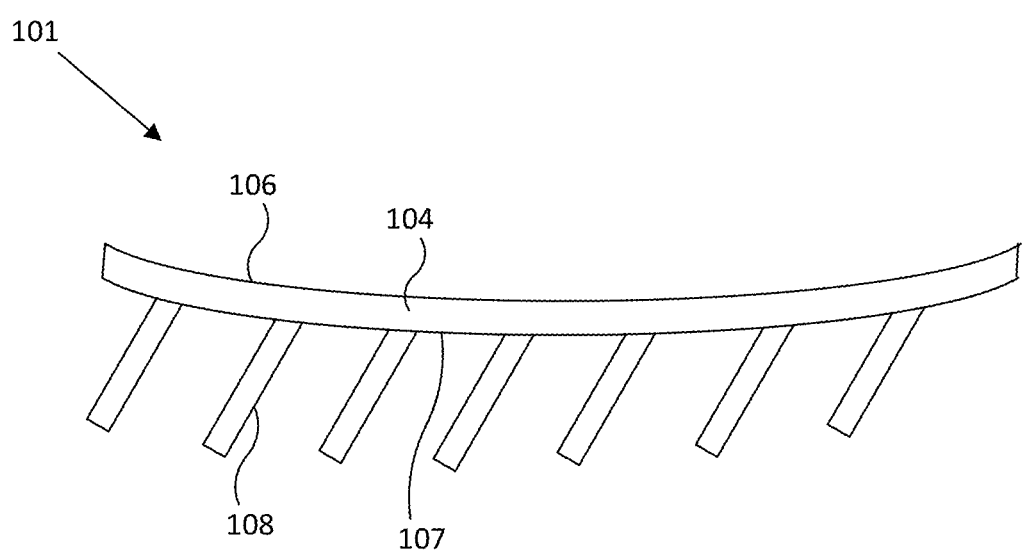
FIG. 9b is a side view diagram of the cure tool, according to examples of the subject disclosure.

FIG. 9b is a side view diagram of the cure tool 101, according to other examples of the subject disclosure. In certain embodiments, the fins 108 are configured to extend or protrude from the back surface 107 so that adjacent pairs of fins 108 extend outward in parallel directions (i.e., not converging or diverging). The protrusion of the fins 108, in certain examples, is orthogonal to the back surface 107, as described above with reference to FIGS. 1-8, or alternatively at non-orthogonal angles as depicted here.

Figure 10:
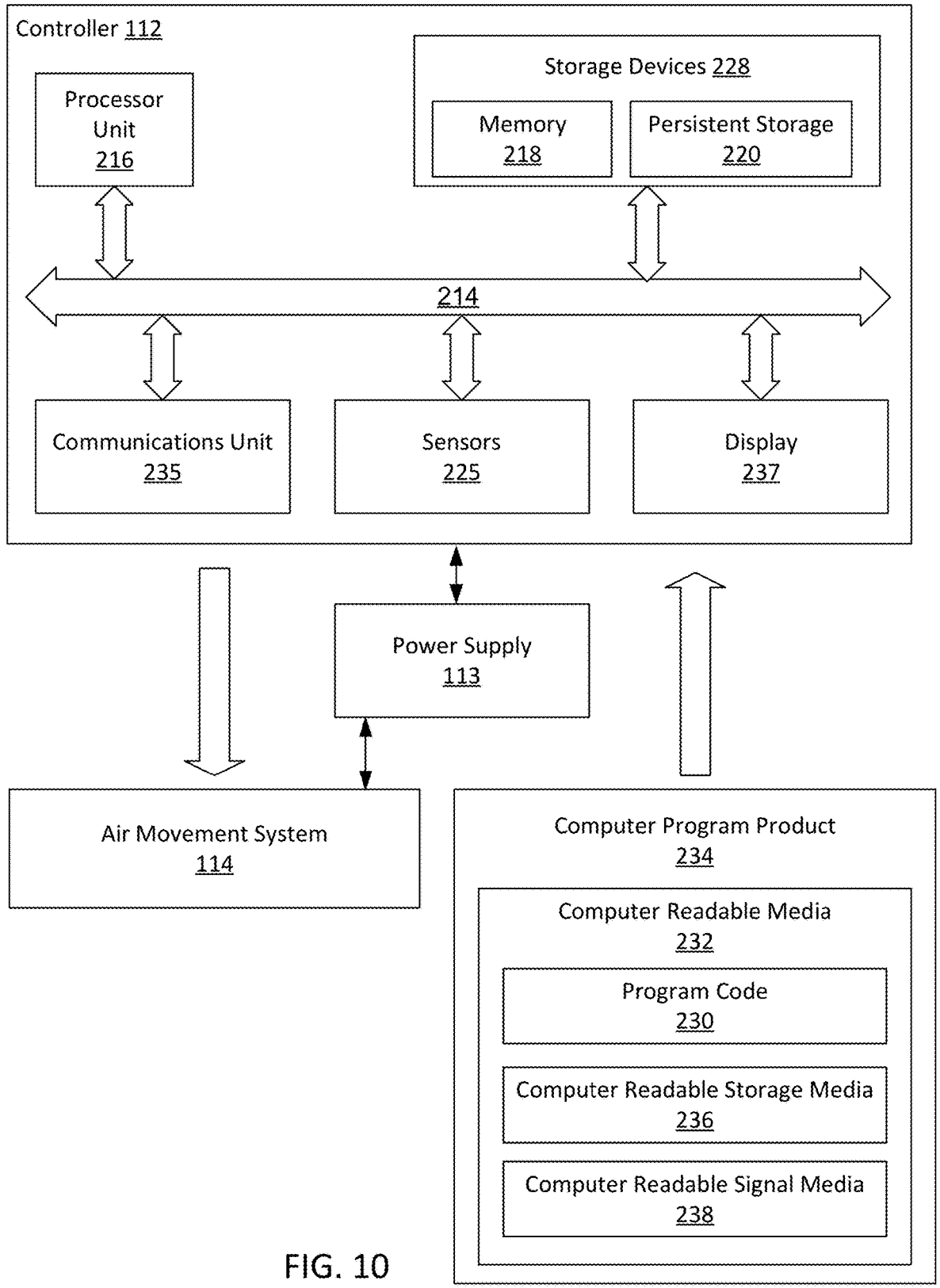
FIG. 10 is a schematic block diagram illustrating a system that includes a controller, according to examples of the subject disclosure.

FIG. 10 is a schematic block diagram illustrating a controller 112, according to examples of the subject disclosure. The controller 112 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, sensors 225 (such as temperature sensors), persistent storage 220, a communications unit 235, and a display 237. The sensors 225, in certain examples, are configured to detect a temperature of ambient air, a temperature of a fin 108, and a temperature of a composite component 102.

The processor unit 216 serves to execute instructions for software that are loaded into memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communication unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 112 for execution by the processor unit 216. In some examples, the program code also contains the curing plan discussed above. The program code 230 and computer readable storage media 236 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 112. In some instances, the computer readable storage media 236 is not removable from the controller 112.

Alternatively, the program code 230 is transferred to the controller 112 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 112. In one instance, program code stored in a computer readable storage media in a server data processing system is downloaded over a network from a server to the controller 112. According to various examples, the system providing the program code 230 is a server computer, a client computer, or some other device capable of storing and transmitting program code 230.

The different components illustrated for the controller 112 are not meant to provide physical or architectural limitations to the manner in which different examples can be implemented. The different illustrative examples can be implemented in a controller including components in addition to and/or in place of those illustrated for the controller 112. Other components shown in FIG. 10 can be varied from the illustrative examples shown. The different examples can be implemented using any hardware device or system capable of executing program code. For example, a storage device in the controller 112 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
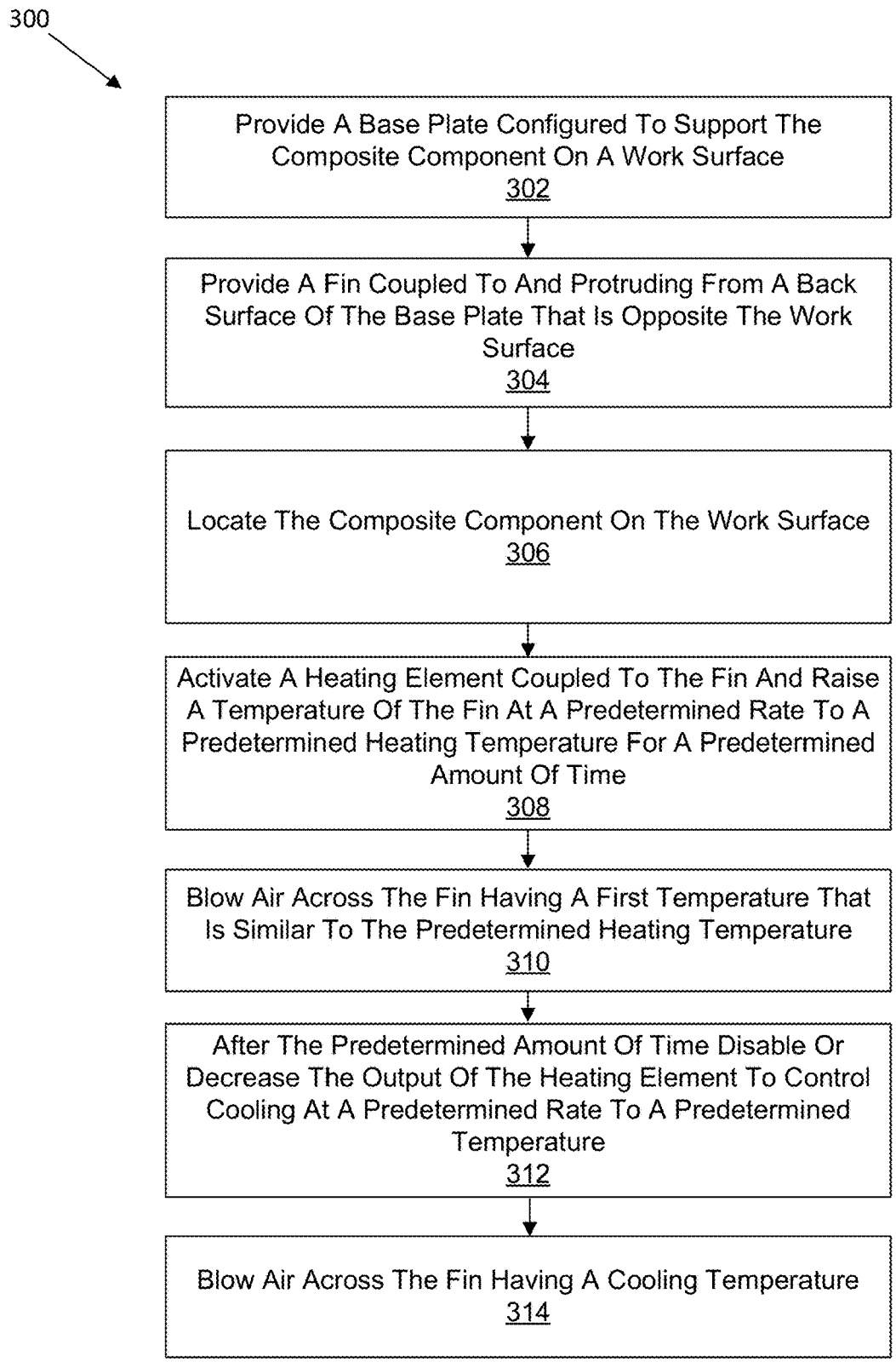
FIG. 11 is a flowchart diagram of a method for controlling a cure cycle of the composite component, according to examples of the subject disclosure.

FIG. 11 is a flowchart diagram of a method 300 of controlling a cure cycle of the composite component 102, according to examples of the subject disclosure. Method 300, in certain examples is performed, at least partially, by processing logic that includes hardware (e.g., circuitry, dedicated logic, programmable logic, microcode, etc.), software (such as instructions run on a processing device), firmware or a combination thereof. In one example, at least some steps (e.g., steps 308-314) of the method 300 is performed or controlled by the controller 112 of FIG. 1.

The method 300 starts and includes, at block 302, providing a base plate 104 configured to support the composite component 102 on a work surface 106. At block 304, the method 300 includes providing a fin 108 coupled to and protruding from a back surface 107 of the base plate 104. In certain examples, the back surface 107 is opposite the work surface 106.

At block 306, the method 300 includes locating the composite component 102 on the work surface 106 of the base plate 104. The method 300 then includes, at block 308, activating a heating element that is coupled to the fin and raises a temperature of the fin to at a predetermined rate to a predetermined heating temperature for a predetermined amount of time. This predetermined heating temperature and time comprises the heating portion of the cure cycle. Heat generated by the heating elements conductively transfers into the composite component 102. According to some examples, the method 300 includes activating one or more heating elements 110, by selectively controlling a heat output of a heating element 110, coupled to each of one or more fins 108 to raise a temperature, at a predetermined heating rate, of the one or more fins 108 and the base plate 104, thermally coupled to the one or more fins 108 and from which the one or more fins 108 protrudes, at a predetermined heating rate to a predetermined temperature for a predetermined amount of time and to heat the composite component 102. In certain examples, the predetermined temperature and the predetermined amount of time are selected to cure a resin of the composite component 102.

In certain examples, the method 300 includes, at block 310, after heating the composite part, blowing air across the fin having a first temperature that is substantially the same as the predetermined heating temperature. This beneficially speeds-up and maintains the predetermined heating temperature throughout the heating portion of the cure cycle.

At block 312, the method 300 includes decreasing or disabling the output of the heating element 110 to control cooling at a predetermined rate to a predetermined temperature, after a predetermined amount of time. The predetermined amount of time is defined in the heating portion of the cure cycle, for example. The method 300 includes, at block 314, blowing air across the fin 108 having a cooling temperature as part of the cooling portion of the cure cycle. In certain examples, a predetermined cooling temperature together with a decreased output of the heating element 110 allows for a controlled cool down of the composite component 102.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A cure tool for managing thermal cycling of a composite component, the cure tool comprising:
   a base plate comprising a work surface, for supporting the composite component, and a back surface opposite the work surface;
   one or more fins protruding from the back surface of the base plate and in thermal communication with the base plate, the one or more fins comprises a planar surface; and
   one or more separately controllable heating elements directly coupled to the planar surface of one of the one or more fins and configured to selectively provide heat to the base plate.

2. The cure tool of claim 1, further comprising:
   a controller operatively coupled with the one or more heating elements and configured to selectively control the one or more heating elements to generate heat; and
   wherein the controller is further configured to raise a temperature of the cure tool during a heating portion of a cure cycle, by selectively controlling the one or more heating elements to generate heat, and to lower the temperature of the cure tool during a cooling portion of the cure cycle, by selectively controlling a heat output of the one or more heating elements.

3. The cure tool of claim 2, further comprising an air movement system configured to generate an air flow of a predetermined temperature and direct the air flow across the one or more fins.

4. The cure tool of claim 3, wherein the controller is:
   operatively coupled with the air movement system; and
   configured to selectively control the air movement system to generate the air flow of the predetermined temperature and direct the air flow across the one or more fins.

5. The cure tool of claim 1, wherein:
   each one of the one or more fins protrudes outwardly from the back surface of the base plate a distance;
   the distances of the one or more fins are substantially the same; and
   the distances are in the range of between about 0.5 inches and about 5 inches.

6. The cure tool of claim 1, wherein:
   each one of one or more fins protrudes orthogonally outwardly from the back surface of the base plate a distance; and
   the distance that at least a first one of the one or more fins protrudes is different than the distance that at least a second one of the one or more fins protrudes.

7. The cure tool of claim 1, wherein:
   at least one fin of the one or more fins comprises a non-planar surface; and
   at least one heating element of the one or more heating elements is coupled to the non-planar surface of the at least one fin.

8. The cure tool of claim 1, wherein the one or more fins are releasably coupled to the base plate.

9. The cure tool of claim 8, wherein:
   at least one fin of the one or more fins comprises a channel; and
   at least one heating element of the one or more heating elements is at least partially positioned within the channel.

10. The cure tool of claim 8, wherein:
    at least one fin of the one or more fins comprises a mounting surface;
    the base plate comprises a recess; and
    the mounting surface of the at least one fin is nested within the recess of the base plate.

11. The cure tool of claim 10, further comprising:
    a thermally conductive compound disposed between the recess of the base plate and the mounting surface of the at least one fin; and
    a fastener coupling the at least one fin to the base plate.

12. The cure tool of claim 1, wherein:
    at least one fin of the one or more fins comprises:
       a flange configured to engage the back surface of the base plate; and
       a web protruding from the flange and away from the back surface; and
    at least one heating element of the one or more heating elements is coupled to the flange or the web of the at least one fin.

13. The cure tool of claim 12, wherein the at least one heating element is coupled to the flange.

14. The cure tool of claim 13, wherein:
    the web extends longitudinally along a length of the flange and protrudes from the flange at a middle portion of the flange to divide the flange into a first flange portion and a second flange portion; and
    the at least one heating element is disposed on the flange and extends around the web and along both the first flange portion and the second flange portion.

15. The cure tool of claim 13, wherein:
    the web extends longitudinally along a length of the flange and protrudes from an edge of the flange; and
    the at least one heating element is disposed on the flange adjacent the web.

16. The cure tool of claim 12, where the at least one heating element is coupled to the web.

17. A method of controlling a cure cycle for a composite component, the method comprising:
    locating the composite component on a work surface of a base plate;
    separately activating one or more heating elements directly coupled to a planar surface of one or more fins to raise a temperature of the one or more fins and the base plate, thermally coupled to the one or more fins and from which the one or more fins protrudes, at a predetermined heating rate to a predetermined temperature for a predetermined amount of time and to heat the composite component, wherein the predetermined temperature and the predetermined amount of time are selected to cure a resin of the composite component; and
    after heating the composite component, blowing air, at a cooling temperature less than the predetermined temperature, across the one or more fins to cool the composite component at a predetermined rate.

18. The method of claim 17, further comprising:
    before blowing air at the cooling temperature and after heating the composite component, blowing air, substantially at the predetermined temperature, across the one or more fins; and after blowing air at the predetermined temperature and before blowing air at the cooling temperature, decreasing an amount of heat output of the one or more heating elements.

19. A cure tool for managing thermal cycling of a composite component, the cure tool comprising:
- a base plate comprising a work surface, for supporting the composite component, and a back surface opposite the work surface;
- a fin protruding from the back surface of the base plate and in thermal communication with the base plate; and
- a heating element directly coupled to a planar surface of the fin and configured to selectively provide heat to the base plate.

20. The cure tool of claim 1, wherein the at least one heating element directly coupled to the planar surface of at least a first one of the one or more fins is closer to the base plate than the at least one heating element directly coupled to the planar surface of at least a second one of the one or more fins.

* * * * *